(12) United States Patent
Ross

(10) Patent No.: US 6,357,778 B1
(45) Date of Patent: Mar. 19, 2002

(54) HITCH AND TRAILER ASSEMBLY

(76) Inventor: Louis J. Ross, 1060 Lighthouse Dr., Cheboygan, MI (US) 49721

(*) Notice: Subject to any disclaimer, the term of this patent is extended or adjusted under 35 U.S.C. 154(b) by 0 days.

(21) Appl. No.: 09/536,492

(22) Filed: Mar. 27, 2000

Related U.S. Application Data

(63) Continuation-in-part of application No. 08/900,740, filed on Jul. 26, 1997, now Pat. No. 6,042,135.

(51) Int. Cl.$^7$ ................................ B60D 1/50; B60D 7/00
(52) U.S. Cl. ........................ 280/456.1; 280/460.1; 280/484
(58) Field of Search ........................... 280/457, 494, 280/500, 501, 459, 460.1, 483, 484, 486, 488, 456.1; 293/125

(56) References Cited

U.S. PATENT DOCUMENTS

| | | |
|---|---|---|
| 854,196 A | 5/1907 | Brown |
| 1,234,788 A | 7/1917 | Milner |
| 1,401,786 A | 12/1921 | Kapferer |
| 2,078,492 A | 4/1937 | Gurton et al. |
| 2,187,136 A | 1/1940 | Mellinger |
| 2,198,270 A | 4/1940 | Maranville |
| 2,240,886 A | 5/1941 | Greiner |
| 2,287,234 A | 6/1942 | Ducharme |
| 2,345,945 A | 4/1944 | Miner |
| 2,475,174 A | 7/1949 | Boone |
| 2,568,261 A | 9/1951 | Stade |
| 2,570,482 A | 10/1951 | Pruitt |
| 2,638,353 A | 5/1953 | Danielson et al. |
| 2,712,945 A | 7/1955 | Peterson |
| 2,828,144 A | 3/1958 | Hosmer |
| 2,840,411 A | 6/1958 | Mason |
| 3,033,593 A | 5/1962 | Zaha |
| 3,098,257 A | 7/1963 | Zaha |
| 3,236,541 A | 2/1966 | Poteet |
| 3,271,050 A | 9/1966 | Saunders |
| 3,291,503 A | 12/1966 | Lay |
| 3,447,813 A | 6/1969 | Wolf |
| 3,708,183 A | 1/1973 | Jones |
| 3,779,407 A * | 12/1973 | Gillem ..................... 414/563 |
| 3,779,580 A | 12/1973 | Thelen |
| 3,891,231 A * | 6/1975 | Snoberger et al. ......... 280/788 |
| D235,760 S | 7/1975 | Genzel |
| 4,076,264 A | 2/1978 | Chatterley |
| 4,239,253 A | 12/1980 | Golze |
| 4,295,659 A | 10/1981 | Mergen |
| 4,305,602 A | 12/1981 | Ungvari et al. |
| 4,331,345 A * | 5/1982 | William ................. 280/405.1 |
| 4,388,012 A | 6/1983 | Erickson |
| 4,426,097 A | 1/1984 | Livingston |
| 4,452,465 A | 6/1984 | Bourke |
| 4,512,593 A | 4/1985 | Ehrhardt |
| 4,645,230 A | 2/1987 | Hammons |
| 4,664,403 A | 5/1987 | Livingston |
| 4,711,461 A | 12/1987 | Fromberg |
| 4,890,854 A | 1/1990 | Hoover |
| 5,108,121 A | 4/1992 | Collis |
| 5,244,226 A | 9/1993 | Bergh |
| 5,375,867 A | 12/1994 | Kass et al. |
| 5,413,364 A | 5/1995 | Hafendorfer |
| 5,474,320 A | 12/1995 | Bojarski et al. |
| 5,478,124 A | 12/1995 | Warrington et al. |
| 5,507,515 A | 4/1996 | Schellenberg et al. |

(List continued on next page.)

*Primary Examiner*—Kevin Hurley
(74) *Attorney, Agent, or Firm*—Bliss McGlynn & Nolan, P.C.

(57) ABSTRACT

A hitch and trailer assembly includes a trailer having a mounting member and a hitch receiver mountable to a motor vehicle for receiving the mounting member. The hitch and trailer assembly also include a plurality of rollers for connection to one of the trailer and the motor vehicle and a plurality of bumpers for connection to the other one of the trailer and the motor vehicle to allow the rollers and the bumpers abut each other when the mounting member is disposed in the hitch receiver.

22 Claims, 12 Drawing Sheets

U.S. PATENT DOCUMENTS

| | | |
|---|---|---|
| 5,516,140 A | 5/1996 | Hinte |
| 5,580,088 A | 12/1996 | Griffith |
| 5,647,604 A | 7/1997 | Russell |
| 5,664,796 A | 9/1997 | Huyzers |
| 5,709,274 A | 1/1998 | Herbold |
| 5,836,603 A | 11/1998 | Logan et al. |
| 5,853,187 A | 12/1998 | Maier |
| 6,042,135 A | 3/2000 | Ross |

* cited by examiner

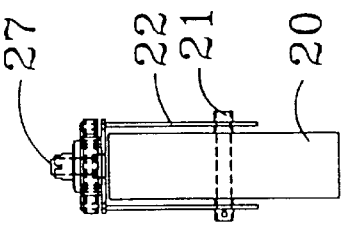
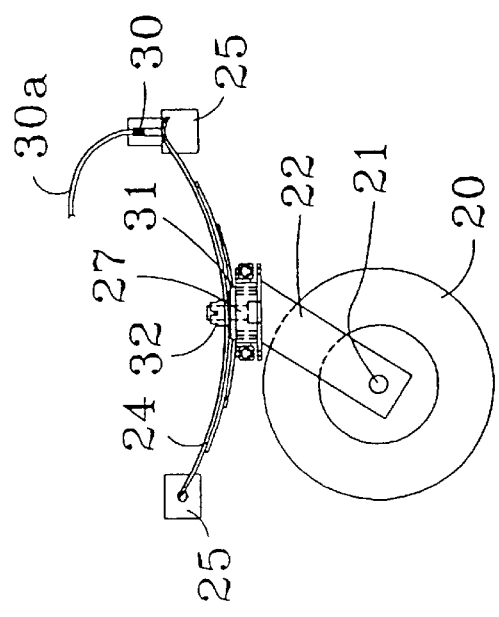
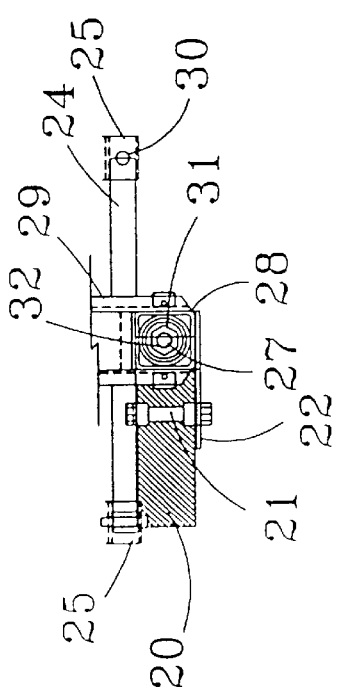
Fig. 5c
Fig. 5b
Fig. 5a

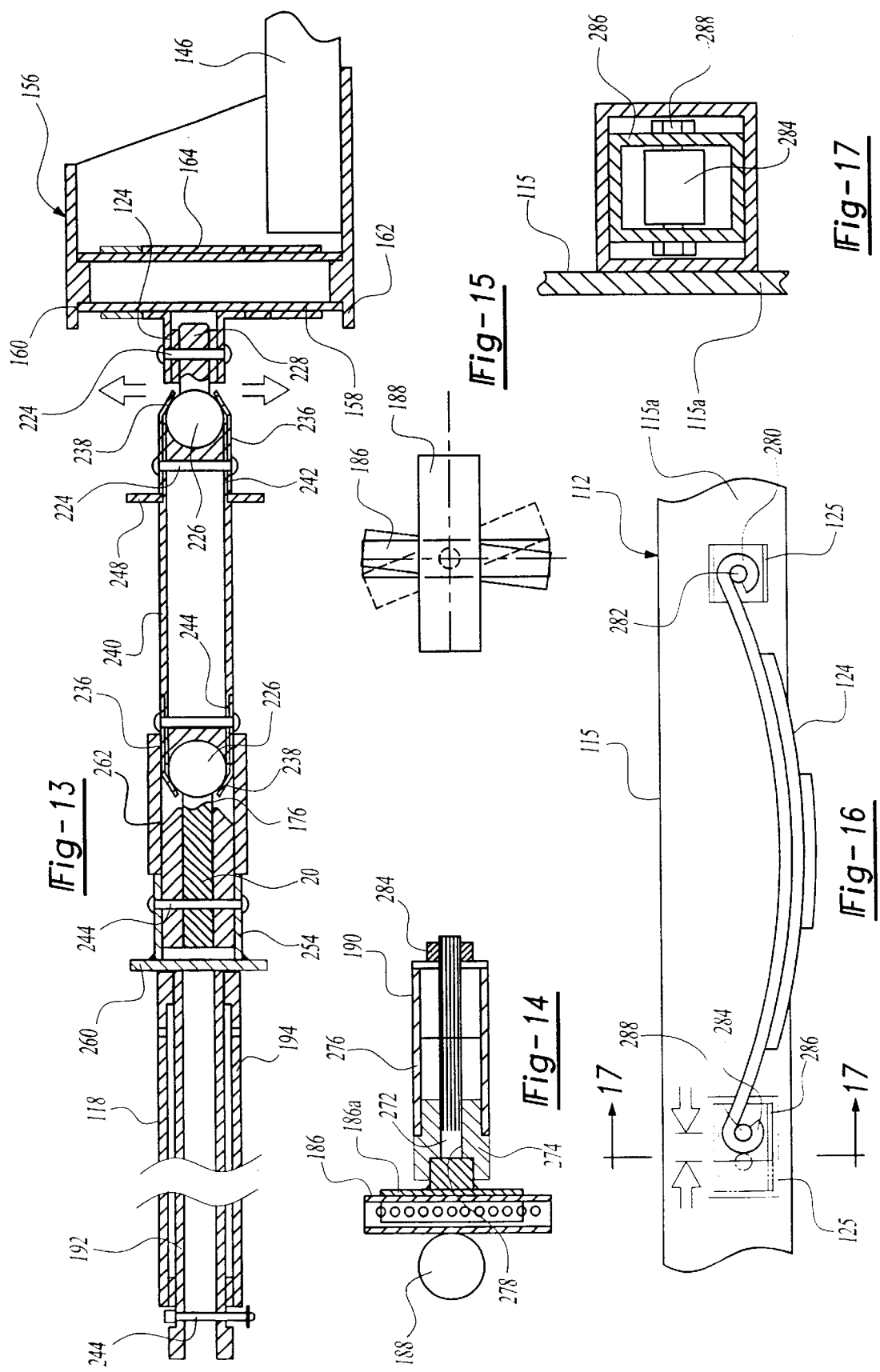

HITCH AND TRAILER ASSEMBLY

CROSS-REFERENCE TO RELATED APPLICATION(S)

The present application is a Continuation-In-Part of application Ser. No. 08/900,740, filed Jul. 26, 1997 U.S. Pat. No. 6,042,135.

BACKGROUND OF THE INVENTION

1. Field of the Invention

The present invention relates generally to hitches and trailers and, more specifically, to a hitch and trailer assembly for a motor vehicle.

2. Description of the Related Art

Oftentimes, trailers are used in conjunction with motor vehicles. The trailers are attached to a rear of the motor vehicle. An example of such a trailer is disclosed in U.S. Pat. No. 1,234,788 to Milner. This patented trailer has a body having two spaced bars at its forward end, which are secured to a rear end of a motor vehicle. The trailer also includes four wheels at the corners of a body that are journaled in forks which are, in turn, journaled in boxes or bearings which are secured to the body.

U.S. Pat. No. 3,033,593 to Zaha discloses a hitch assembly that incorporates the use of three hitch points and dirigible wheels. This hitch assembly is difficult to operate. More specifically, connecting the center hitch point to the motor vehicle while properly aligning the outer two hitch points to be connected to the motor vehicle is difficult. As a result, the trailer and the motor vehicle require proper alignment. Therefore, there is a need in the art for a hitch and a trailer assembly that provides for connection to the motor vehicle without perfect alignment therebetween.

SUMMARY OF THE INVENTION

It is, therefore, one object of the present invention to provide a new and improved hitch and trailer assembly for a motor vehicle.

It is another object of the present invention to provide a hitch assembly having a single point connection between a trailer and a motor vehicle.

It is yet another object of the present invention to provide a trailer with steerable wheels that is capable of carrying loads.

It is still another object of the present invention to provide a trailer with wheels having anti-pivot brakes.

It is a further another object of the present invention to provide a trailer that allows easier wheel repair.

It is a still further object of the present invention to provide a trailer that can be extended and tilted.

Accordingly, the present invention is a hitch and trailer assembly including a trailer having a mounting member and a hitch receiver mountable to a motor vehicle for receiving the mounting member. The hitch and trailer assembly also include a plurality of rollers for connection to one of the trailer and the motor vehicle and a plurality of bumpers for connection to the other one of the trailer and the motor vehicle to allow the rollers and the bumpers abut each other when the mounting member is disposed in the hitch receiver.

One advantage of the present invention is that a new and improved hitch and trailer assembly is provided for a motor vehicle. Another advantage of the present invention is that the hitch and trailer assembly is provided with a hitch assembly that is a spring mounted, single point, close coupling design which will connect with limited effort to a motor vehicle regardless of either the slope or contour of the surface which supports them. Yet another advantage of the present invention is that the hitch assembly is easier to use and more versatile. Still another advantage of the present invention is that the hitch and trailer assembly is provided with a new and improved trailer with steerable wheels having anti-pivot braking for when the wheels are airborne and is capable of carrying loads. A further advantage of the present invention is that the trailer has lockable legs capable of supporting a parked trailer in a level or angled position or to passively jack the trailer up to allow wheel repair. Yet a further advantage of the present invention is that the trailer is capable of being easily converted to a conventional extra long tongue trailer with non-steerable wheels. Still a further advantage of the present invention is that the trailer is capable of tilting.

Other objects, features and advantages of the present invention will be readily appreciated, as the same becomes better understood, after reading the subsequent description when considered in connection with the accompanying drawings.

BRIEF DESCRIPTION OF THE DRAWINGS

FIG. 5A is a plan view of a wheel for the trailer of FIG. 1.

FIG. 5B is an elevational view of the wheel for the trailer of FIG. 1.

FIG. 5C is a side view of the wheel for the trailer of FIG. 1.

FIG. 13 is a fragmentary elevational view of the hitch assembly and trailer of FIG. 10.

FIG. 14 is a fragmentary view of a portion of the trailer of FIG. 10.

FIG. 15 is an elevational view of a portion of the trailer of FIG. 10.

FIG. 16 is a side elevational view of a portion of the trailer of FIG. 10.

FIG. 17 is a sectional view taken along line 17—17 of FIG. 16.

DESCRIPTION OF THE PREFERRED EMBODIMENT(S)

Figure 1:
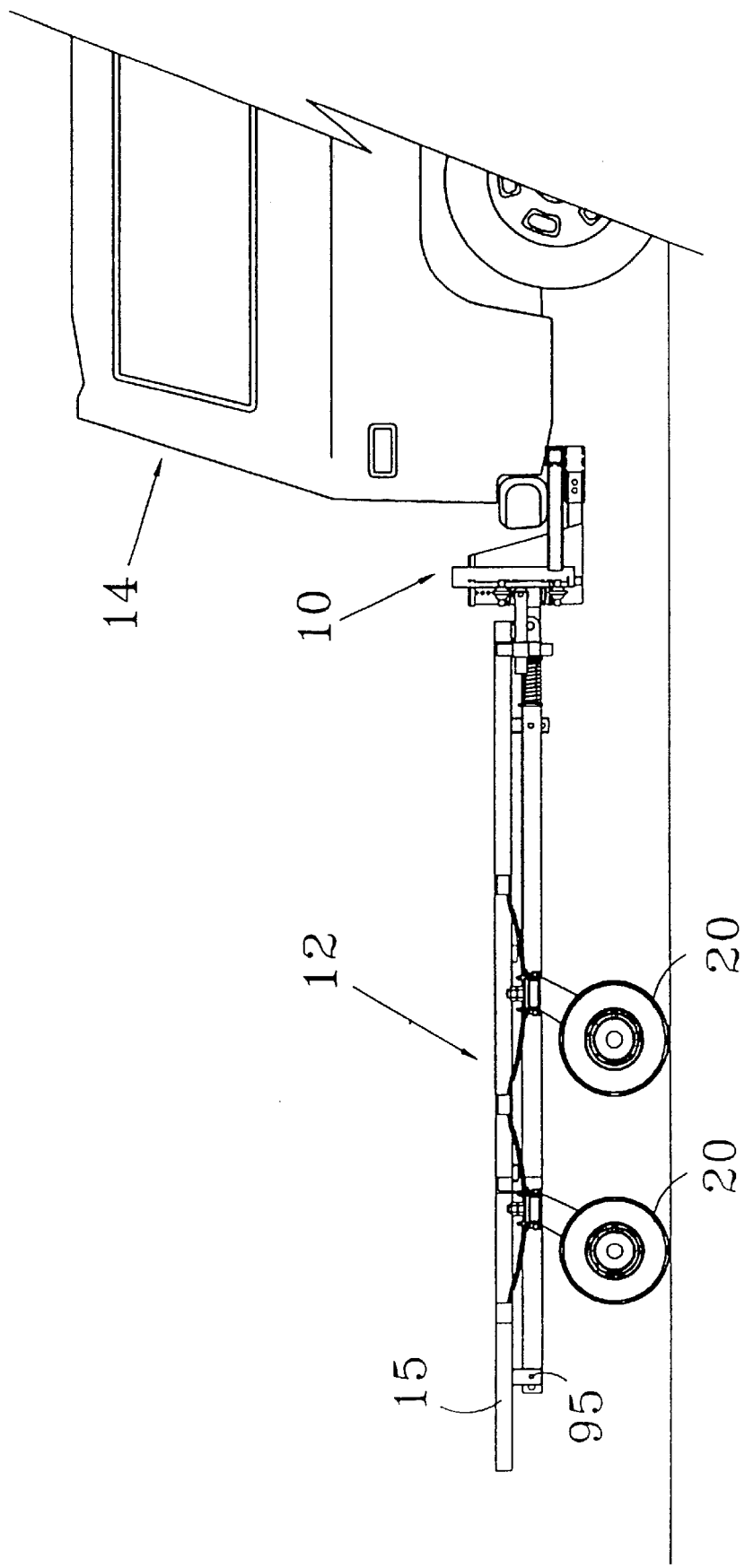
FIG. 1 is an elevational view of a hitch assembly and trailer, according to the present invention, illustrated in operational relationship with a motor vehicle.

Referring to FIG. 1, one embodiment of a hitch assembly 10, according to the present invention, is illustrated in operational relationship with a trailer, according to the present invention and generally shown at 12. The hitch assembly 10 allows the trailer 12 to be hitched or connected to a motor vehicle, generally indicated at 14. It should be appreciated that the trailer 12 may be of a flat bed, cargo box, camper type or the like. It should also be appreciated that the trailer 12 may be connected to a front of the motor vehicle 14 for pushing the trailer 12 or connected to a rear of the motor vehicle 14 for pulling the trailer 12.

Figure 2:
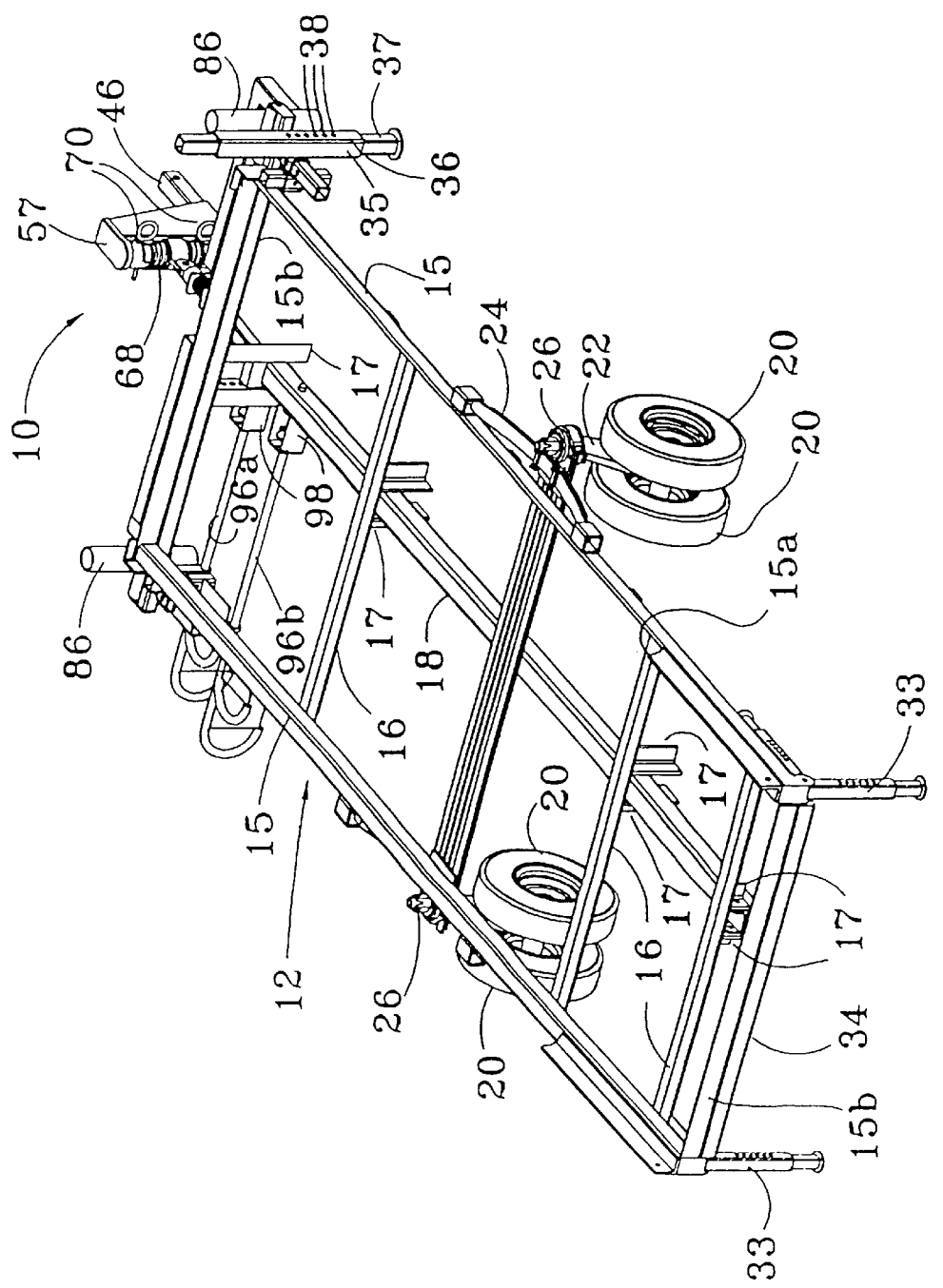
FIG. 2 is a perspective view of the hitch assembly and trailer of FIG. 1.
Figure 3:
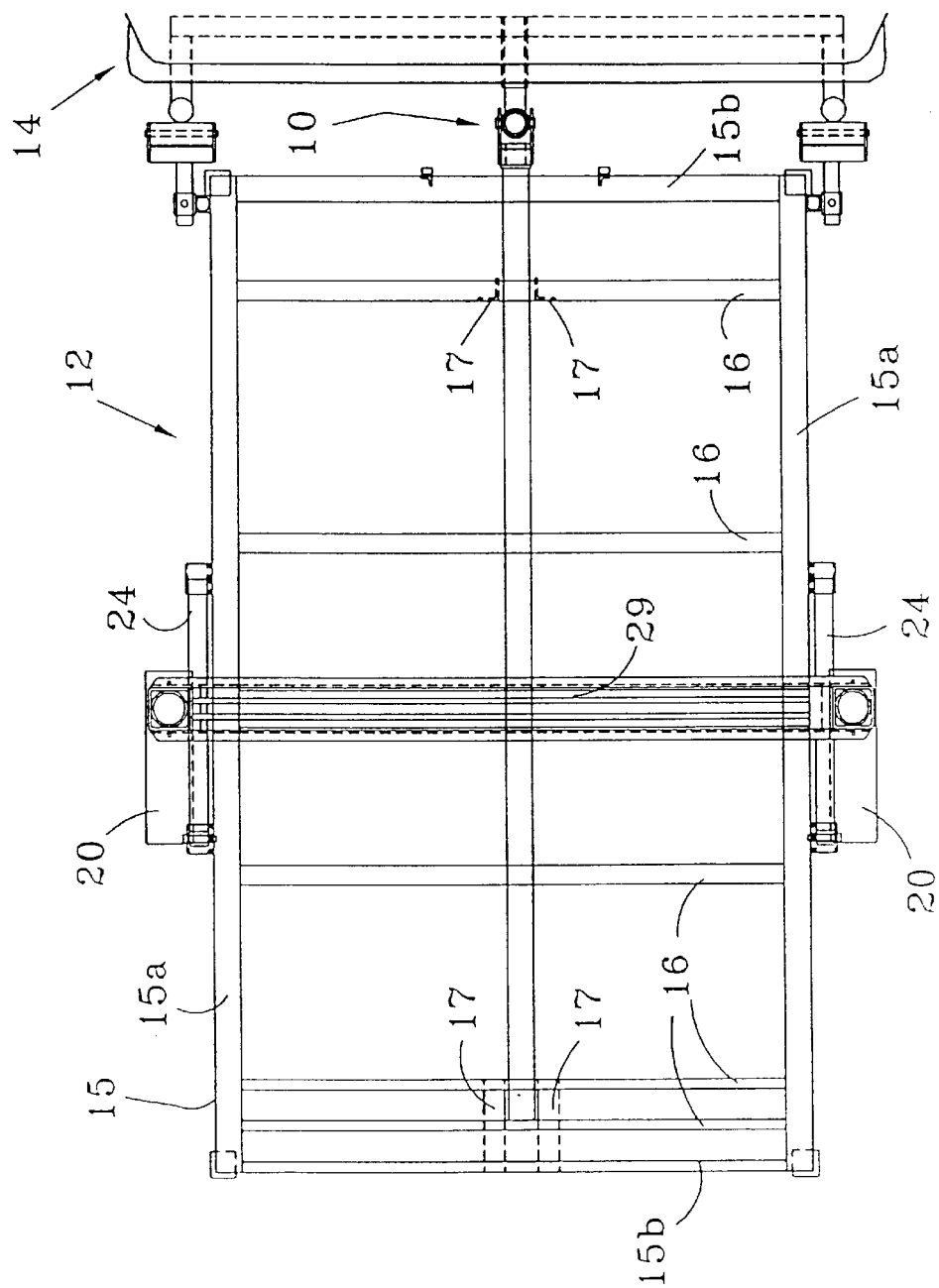
FIG. 3 is a plan view of the hitch assembly and trailer of FIG. 1.

Referring to FIGS. 1 through 3, the trailer 12 includes a generally rectangular frame 15 fabricated from a metal or other rigid material suitable for the purposes of the trailer 12. The frame 15 includes two longitudinal side members 15a and two transverse end members 15b. The frame 15 includes a plurality of cross members 16 extending between the side members 15a. In one embodiment, the cross members 16 extend generally perpendicularly to the side members 15a. The frame 15 includes a plurality of guides 17, which extend downwardly from each of the cross members 16. The frame 15 includes a length adjuster 18 to extend through the guides 17 to allow the length adjuster 18 to extend the trailer 12 in a manner to be described.

Referring to FIGS. 1, 3 and 5A through 5C, the trailer 12 also includes a plurality of wheels 20 extending down from the frame 15. Each wheel 20 is pivotally connected by an axle 21 to an offset leg 22, which extends down from the frame 15. The offset leg 22 is mounted to a suspension 24 in the form of a leaf spring, which is mounted by supports 25 to the frame 15. The offset leg 22 and the wheel 20 are allowed to pivot through a pivoting mechanism 26. The pivoting mechanism 26 has a bolt 27 attached to the offset leg 22 and extends through a housing 28. A cross member 29 is attached to the housing 28 and suspension 24 and extends transversely across the frame 15 between a pair of the wheels 20. The pivoting mechanism 26 also includes a housing 29 and a washer plate 31 and a castle nut 32 secured to the bolt 27.

The trailer 12 also includes an adjustable friction pressure anti-pivot brake 30. The brake 30 may be of any type and is preferably a hydraulic brake cylinder receiving fluid pressure from a line 30a connected to a source (not shown). The brake 30 is to slow or stop pivoting of the wheel 20 when the wheel 20 is airborne such as when traveling at a fast speed on rough roads. The brake 30 may also be activated mechanically, electrically or pneumatically. It should be appreciated that the pivoting mechanism 26 allows the wheel 20 to be steerable as long as there is appreciable pressure between the road or ground surface and the tires of the wheels 20. It should also be appreciated that the pivoting mechanism 26 may be locked to prevent steering of the wheel 20. It should further be appreciated that the wheel 20 may be a single wheel or a dual wheel located inside or outside the frame 15.

Figure 7:
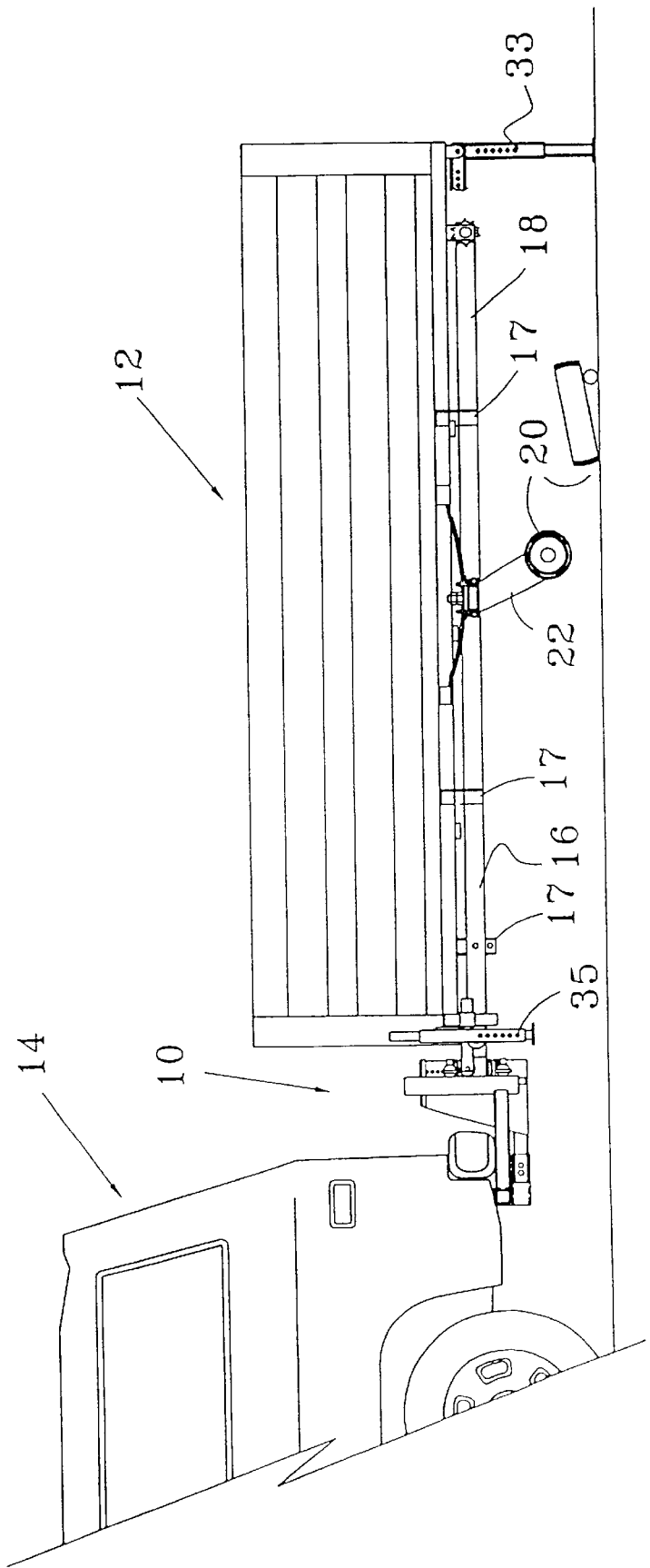
FIG. 7 is an elevational view of the hitch assembly and trailer of FIG. 1 illustrating the trailer with side racks and self-jacking leg for wheel repair.

The trailer 12 further includes a pair of rear legs 33 pivotally secured to an end support 34 of the frame 15. The legs 33 may be pivoted downwardly to engage the ground such that the wheels 20 may be removed for repair or replacement as illustrated in FIG. 7. The trailer 12 also includes a pair of front legs 35 (one shown). The front leg 35 and the rear legs 33 may be constructed such that the lengths thereof are adjustable. The front leg 35 includes a female tube 36 and a male tube 37 telescoping therethrough. A plurality of apertures or holes 38 extend through both the female tube 36 and the male tube 37 wherein a pin (not shown) may be inserted into one of the plurality of holes 38 to secure the male tube 37 with respect to the female tube 36 to establish a desired length of the front leg 35. It should be appreciated that the rear legs 33 may be adjusted in a similar manner.

Figure 4:
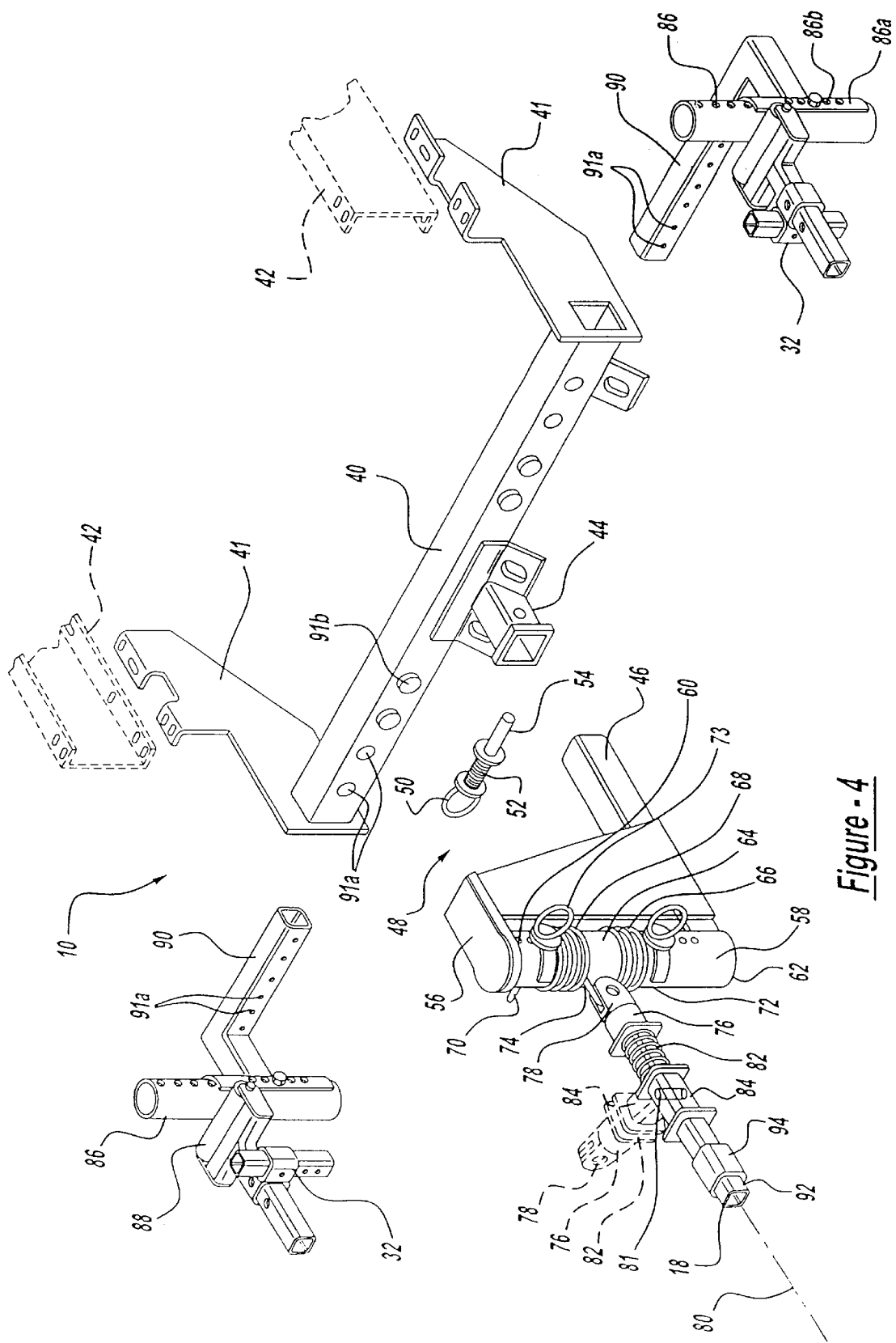
FIG. 4 is a perspective view of the hitch assembly of FIG. 1.
Figure 6:
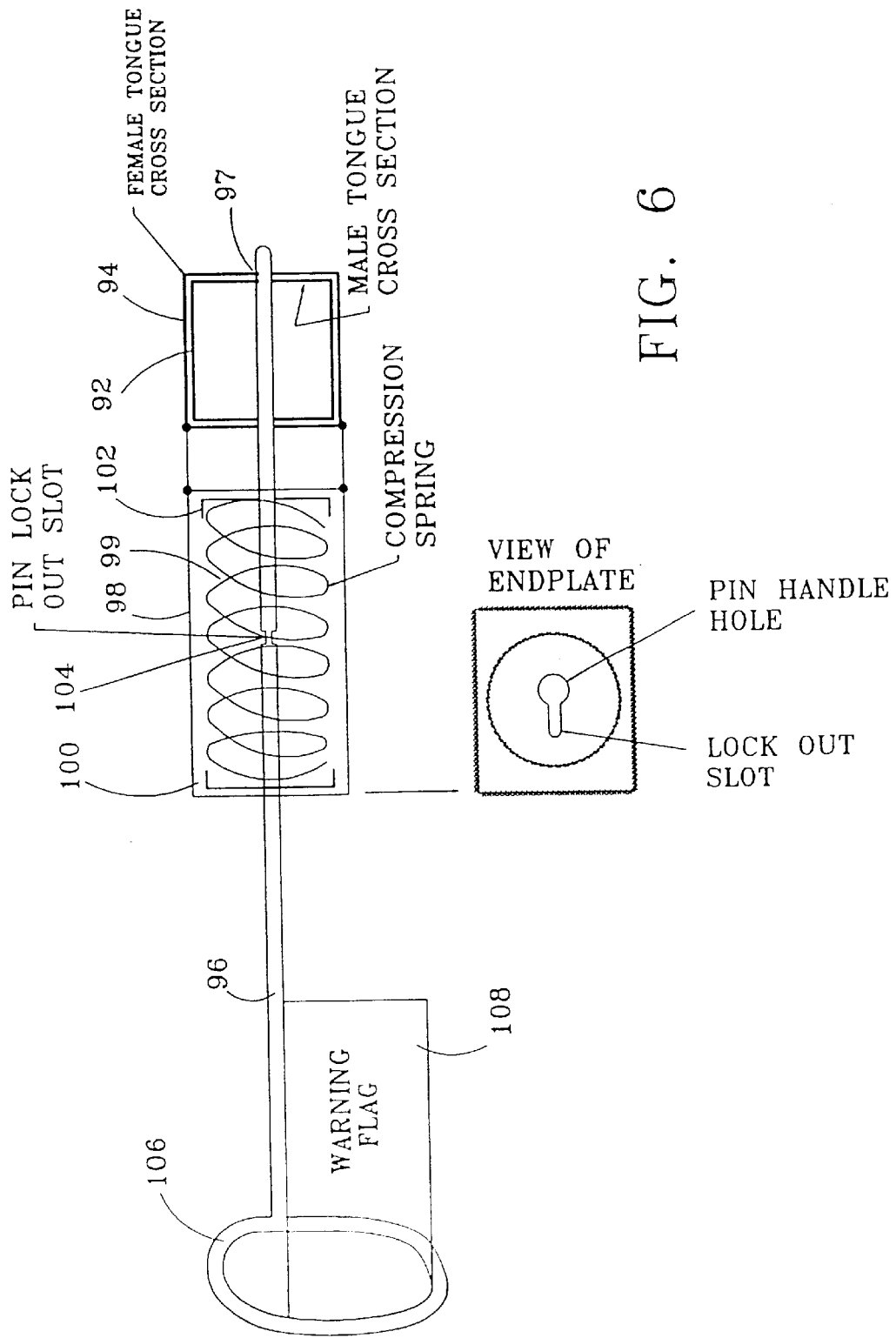
FIG. 6 is a fragmentary view of a portion of the trailer of FIG. 1.

Referring to FIG. 4, the hitch assembly 10 is used to connect the trailer 12 to the motor vehicle 14. The hitch assembly 10 includes a cross tube 40 secured by brackets or flanges 41 to a frame 42 of the motor vehicle 14. The flanges 41 are secured to the cross tube 40 by suitable means such as welding and to the frame 42 by suitable means such as fasteners (not shown). The cross tube 40 includes a trailer connector or hitch receiver 44.

The hitch assembly 10 includes a mounting member such as a hitch tube 46, which is inserted into and received by the hitch receiver 44. The hitch tube 46 is securable to the hitch receiver 44. In one embodiment, the hitch tube 46 is secured to the hitch receiver 44 using a pin, generally shown at 48. The pin 48 includes a round handle 50 and a spring 52. Once the hitch tube 46 is in position relative to the hitch receiver 44, the pin 48 is slid through both the hitch receiver 44 and the hitch tube 46. The pin 48 is pushed all the way through such that the spring 52 is compressed against a side of the hitch receiver 44. The handle 50 is then rotated one hundred eighty degrees (180°) and gravity causes pivotal end 54 to extend perpendicularly to the rest of the pin 48. The spring 52 forces the pivotal end 54 against the side of the hitch receiver 44 effectively locking the hitch tube 46 to the hitch receiver 44.

The hitch assembly 10 also includes an adapter structure 56 secured to the hitch tube 46. The adapter structure 56 includes a receiving tube 58 attached to the hitch tube 46 by suitable means such as welding. In one embodiment, the receiving tube 58 extends generally perpendicularly to the hitch tube 46 and may point up or down according to need by vehicle height. The receiving tube 58 includes a first end 60 and a second end 62.

The adapter structure 56 also includes a sliding ring 64 encircling the receiving tube 58. The sliding ring 64 is movable along the receiving tube 58 between the first end 60 and the second end 62. The sliding ring 64 provides a first degree of motion for the length adjuster 18 and, more importantly, the trailer 12 when it is to be hitched by the hitch tube 46 to the hitch receiver 44. It should be appreciated that the sliding ring 64 can rotate approximately one hundred twenty degrees (120°) to the right or left which, in combination with the pin connection 74, 78 and the ability of the sliding ring 64 to travel vertically on the receiving tube 58 allows separate vertical movement of the motor vehicle 14 and trailer 12.

The adapter structure 56 includes at least one spring 66 extending about the receiving tube 58 adjacent the sliding ring 64. In one embodiment, a second spring 68 extends around the receiving tube 58 adjacent the other side of the sliding ring 64. Two pins 70 extend through the receiving tube 58 providing stops for the springs 66 such that the sliding ring 64 does not slide past a specific portion of the receiving tube 58. The portion of the receiving tube 58 in which the sliding ring 64 is to slide is determined by the height of the trailer 12 with respect to the height of the cross tube 40 and/or the hitch receiver 44. Each of the two pins 70 includes a magnetic collar 72, which also acts as a spring seat near a handle 73 thereof. In one embodiment, the pin 70 includes a pair of detents (not shown), which engage the edges of the receiving tube 58. The two springs 66, 68 force the edges of the receiving tube 58 into the detents locking the pin 70 in position. The sliding ring 64 includes a flange 74, which extends out from the sliding ring 64. The length adjuster 18 includes a swivel tongue 76 removably attachable by another pin 48 to the sliding ring 64 and, more specifically, the flange 74 of the sliding ring 64. The swivel tongue 76 includes a distal end 78 and is rotatable about a longitudinal axis 80 to provide a second degree of motion. Therefore, a swivel tongue 76 allows separate side to side tipping movement of the motor vehicle 14 and trailer 12 and allows the trailer 12 to be connected to the motor vehicle 14 when the ground is uneven. It should be appreciated that the combination of the sliding ring 64 with flange 74 and distal end 78 with swivel tongue 76 allows the trailer 12 to be connected on uneven ground.

The swivel tongue 76 includes a pivot pin 81 extending therethrough perpendicular to the longitudinal axis 80 allowing the distal end 78 to pivot about the pivot pin 81 providing a third degree of freedom. As may be seen in FIG. 4, the distal end 78 of the swivel tongue 76 is pivotable about the pivot pin 81 allowing the trailer 12 to be connected to the motor vehicle 14 when the trailer 12 and the motor vehicle 14 are not perfectly aligned. The combination of the swivel tongue 76 and length adjuster 18 allows the connection even through the motor vehicle 14 and trailer 12 are at some distance apart laterally and horizontally. A spring 82 forces a stop collar 84 over the pivot pin 81 preventing the swivel tongue 76 from pivoting about the pivot pin 81 unless so desired by the operator of the motor vehicle 14. It should be appreciated that another pivot pin (not shown) may be located forward of the pivot pin 81 and horizontally oriented to allow more vertical movement of the distal end 78 if desired.

The hitch assembly 10 includes at least one bumper tube 86 extending out from the cross tube 40 on either side of the hitch receiver 44 such that they are disposed in space relation to the hitch tube 46. In one embodiment, there is at least one bumper tube 86 on either side of the hitch tube 46. The bumper tube 86 is adjustable vertically by a flange 86a having a plurality of apertures 86b and a fastener 86c extending through the apertures 86b in the flange 86a and bumper tube 86. The flange 86a is part of a horizontal adapter 90 to be described. Extending out from the trailer 12 on either side of the hitch tube 46 is a roller or glide 88, which abuts the bumper tube 86. The roller 88 rolls up and down the bumper tube 86 depending on the relative position of the trailer 12 with respect to the motor vehicle 14. The relative position varies due to the suspension 24 and suspension (not shown) of the motor vehicle 14 having different responses to uneven ground as they move thereacross. The relative position may also be attributable to the uneven ground itself. The roller 88 and bumper tube 86 interface is required on either side of the hitch tube 46 if the wheels 20 are to be steerable. The rollers 88 are connected to the frame 15 of the trailer 12 with the front legs 38. It should be appreciated that the point of contact between the bumper tube 86 and roller 88 must align both vertically and laterally with the pin point connecting the flange 74 and distal end 78 to allow the trailer 12 to flex independently of the motor vehicle 14. It should also be appreciated that the roller 88 may be attached to the motor vehicle 14 and the bumper tube 86 attached to the trailer 12.

The bumper tubes 86 are connected to the cross tube 40 with a horizontal adapter 90. The horizontal adapter 90 defines the spaced relation between the bumper tube 86 and the hitch tube 46. In one embodiment, the horizontal adapter 90 is a tube insertable inside the cross tube 40. The horizontal adapter 90 and cross tube 40 have a plurality of apertures 91a to allow lateral adjustment therebetween. It should be appreciated that fasteners 91b such as bolts pass through a corresponding pair of apertures 91a to secure the horizontal adapter 90 and cross tube 40 together.

Referring to FIGS. 2, 5, 6, 8 and 9, the length adjuster 18 includes a male tube 92 telescopingly disposed and slidably received within a female tube 94. The male tube 92 is attached to the swivel tongue 76 and the female tube 94 is attached by a pin 95 at one end to the guides 17 at the rear end of the frame 15. The length adjuster 18 includes at least one tongue 96 for adjusting the male tube 92 relative to the female tube 94. One tongue 96a goes through front tongue guides 17 just below the length adjuster 18 to prevent the bed of the trailer 12 from tilting. Another tongue 96b is a transversely extending member to engage holes or apertures 97 extending longitudinally along the male tube 92 and female tube 94. Tongue 96a includes a housing 98 secured to a front end of the frame 15. Tongue 96b includes a housing 98 secured to female tube 94. Each tongue includes a spring 99 disposed within the housing 98 and a first spring guide 100 secured to the housing 98 and a second spring guide 102 secured to the tongue 96' at each end of the spring 99. One end of the housing 100 and a portion of the tongue 96 may include cooperating lock-out slots 104 to allow the tongue 96 to be locked in place relative to the housing 100. It should be appreciated that when the tongue 96b is in the lock-out slot 104, the length adjuster 18 is free to move.

Figure 8:
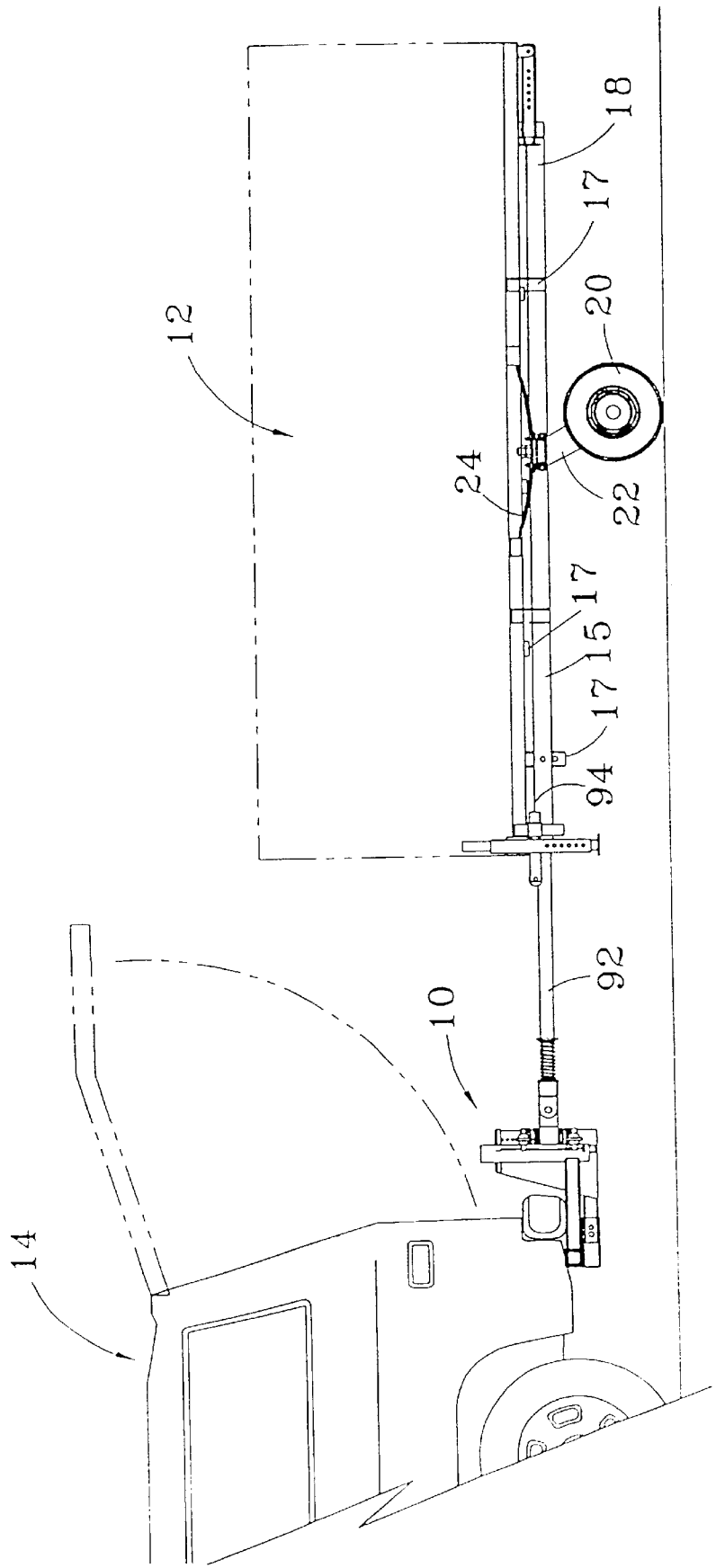
FIG. 8 is an elevational view of the hitch assembly and trailer of FIG. 1 illustrating the trailer with side racks in phantom and extended for access to an interior rear end of the motor vehicle.
Figure 9:
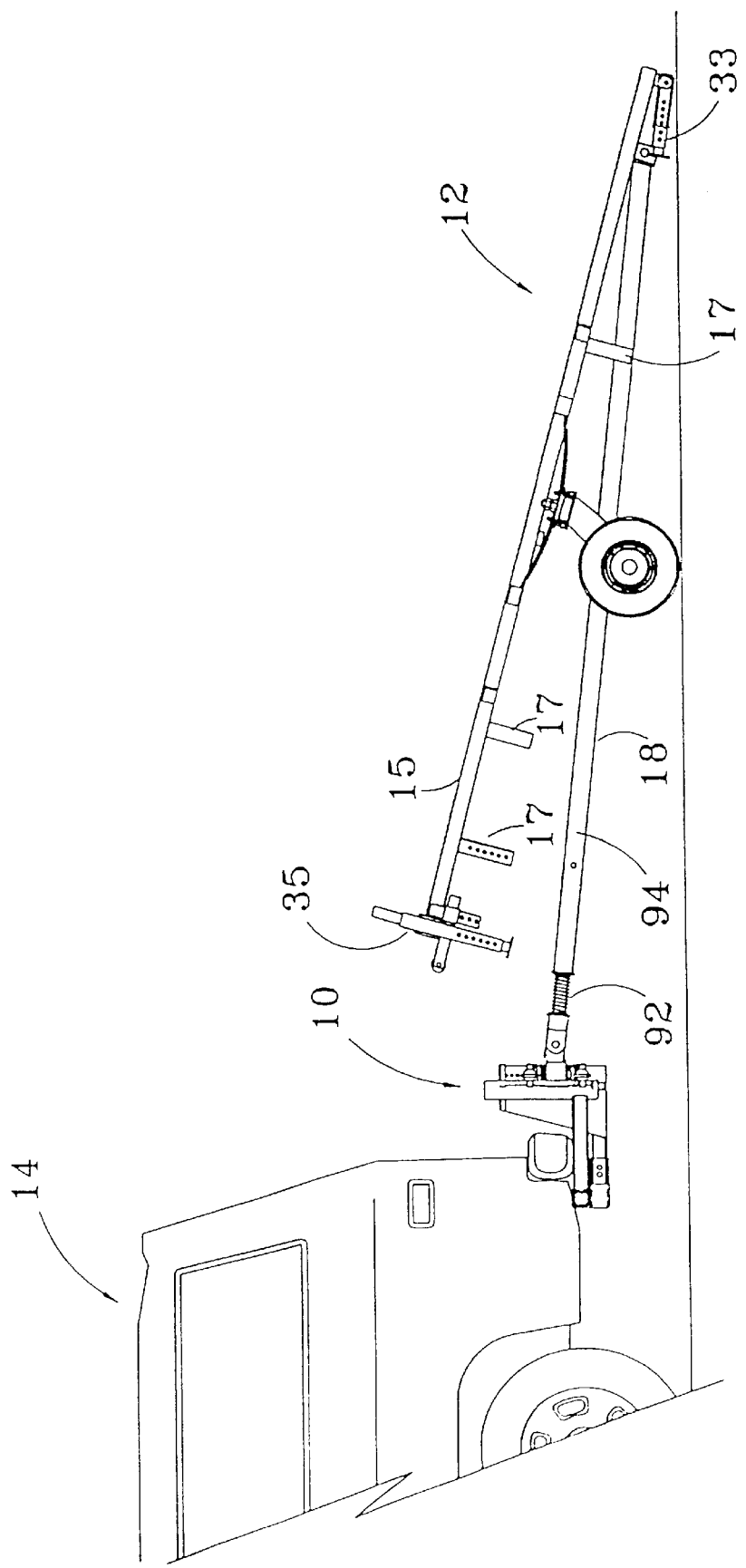
FIG. 9 is an elevational view of the hitch assembly and trailer of FIG. 1 illustrating the trailer with the wheels in reverse and tilted.

The tongue 96 also includes a handle 106 and warning flag 108 at one end to allow the tongue 96 to be moved transversely and to indicate that the tongue 96 has disengaged the male tube 92 and female tube 94. When this occurs, the male tube 92 may be adjusted longitudinally relative to the female tube 94 as illustrated in FIG. 8 to facilitate the hitching of the trailer 12 to the motor vehicle 14 or to allow access to an interior rear end of the motor vehicle 14 or to form a long-tongue trailer (not shown).

As stated above, tongue 96a goes through the front guides 17 just below the length extender 18. When tongue 96a and lock-out slot 104 are engaged, the bed of the trailer 12 is free to tilt. It should be appreciated that the wheels 20 may be reversed to the frame 15 to tilt the frame 15 relative to the length adjuster 18. It should also be appreciated that any type of hitch such as a rotating pin, ball-coupler, pintle, flexible tongue, cable tongue or fifth wheel is compatible with the trailer 12 if the above requirements are met.

In operation, once the motor vehicle 14 and trailer 12 are connected, all pins and tongues 84, 96a and 96b are in place, and the motor vehicle 14 is in motion, the swivel tongue 76 has rotational movement around longitudinal axis of length extender 18 after locked up by locking sleeve 84. The sliding ring 64 has movement allowed by the springs 66 and 68 vertically in combination with that allowed by the pin connecting distal end 78 and ring flange 74. Once close coupled, the rotational movement of the sliding ring 64 is restricted to a few degrees.

Referring to FIGS. 10 through 13, another embodiment, according to the present invention, of the hitch assembly 10 and the trailer 12 is shown for the motor vehicle 14. Like parts of the hitch assembly 10 and the trailer 12 have like reference numerals increased by one hundred (100). In this embodiment, the hitch assembly 110 includes a cross tube 140 secured by brackets or flanges 141 to the frame 42 of the motor vehicle 14. The flanges 141 are secured to the cross tube 140 by suitable means such as welding and to the frame 142 by suitable means such as fasteners (not shown). The cross tube 140 includes a trailer connector or hitch receiver 144.

The hitch assembly 110 includes a hitch tube 146, which is inserted into and received by the hitch receiver 144. The hitch tube 146 is securable to the hitch receiver 144. In one embodiment, the hitch tube 146 is secured to the hitch receiver 144 using a pin, generally shown at 148. The pin 148 includes a round handle 150 and a spring 152. Once the hitch tube 146 is in position relative to the hitch receiver 144, the pin 148 is slid through apertures 153 in both the hitch receiver 144 and the hitch tube 146. The pin 148 is pushed all the way through such that the spring 152 is compressed against a side of the hitch receiver 144. The handle 150 is then rotated one hundred eighty degrees (180°) and gravity causes pivotal end 154 to extend perpendicularly to the rest of the pin 148. The spring 152 forces the pivotal end 154 against the side of the hitch receiver 144 effectively locking the hitch tube 146 to the hitch receiver 144.

The hitch assembly 110 also includes an adapter structure 156 secured to the hitch tube 146. The adapter structure 156 includes a receiving tube 158 formed from an inner tube (not shown) operatively attached to the hitch tube 146 and a plurality of spacers 158a disposed over the inner tube. In one embodiment, the receiving tube 158 extends perpendicularly to the hitch tube 146 and may point up or down according to need by vehicle height. The adapter structure 156 includes a removable first end 160 and a second end 162 for the receiving tube 158. The spacers 158a have various heights for a function to be described. It should be appreciated that the spacers 158a may be removed and re-arranged by removing the first end 160.

The adapter structure 156 also includes a rotatable ring 164 disposed over the inner tube of the receiving tube 158 and between the spacers 158a. The rotatable ring 164 is rotatable about a longitudinal axis of the receiving tube 158 extending between the first end 160 and the second end 162. The rotatable ring 164 may be adjusted for a plurality of positions of height by changing the position of the spacers 158a relative to the rotatable ring 164. The rotatable ring 164 provides a first degree of motion for the length adjuster 118 and, more importantly, the trailer 112 when it is to be hitched by the hitch tube 146 to the hitch receiver 144. It should be appreciated that the rotatable ring 164 can rotate approximately one hundred twenty degrees (120°) to the right or left. It should also be appreciated that the spacers 158a could be eliminated and the inner tube have a plurality of apertures extending diametrically therethrough with a plurality of pins extending through the apertures to allow vertical height adjustment of the rotatable ring 164.

The rotatable ring 164 includes a coupling member 174, which extends out from the sliding ring 164. The coupling member 174 is generally cylindrical in shape and has a cavity 220 extending therein. The coupling member 174 also has an aperture 222 extending diametrically therethrough for a function to be described. The length adjuster 118 includes a swivel member 176a removably attachable by a pin 224 to the rotatable member 164. The swivel member 176a includes a spherically shaped swivel portion 226a and a connecting portion 228a extending from the swivel portion 226a. The connecting portion 228a has an aperture 230a extending diametrically therethrough. The connecting portion 228a is disposed in the cavity 220 and the pin 224 extends through the aperture 222 of the coupling member 174 of the rotatable ring 164 and the aperture 230a of the connecting portion 228a of the swivel member 176a. The length adjuster 118 may include a cup member 232a having a semi-spherical cavity 234a therein to receive the swivel portion 226a of the swivel member 176a. The length adjuster 118 includes a sleeve 236a extending axially and disposed about the swivel member 176a and cup member 232a. The sleeve 236a is generally tubular to receive the swivel member 176a and cup member 232a therein and has an aperture 237 extending therethrough for a function to be described. The sleeve 236a also has a reduced diameter portion 238a extending axially and radially inward to prevent the swivel portion 226a from exiting the sleeve 236a. It should be appreciated that the connecting portion 228a extends through the end of the reduced diameter portion 238a. It should also be appreciated that the swivel member 176a may rotate approximately ninety degrees (90°) relative to a longitudinal axis of the sleeve 236a to provide a second degree of motion. Therefore, the swivel member 176a allows separate side to side tipping movement and separate vertical movement of the motor vehicle 14 and trailer 112 and allows the trailer 112 to be connected to the motor vehicle 14 when the ground is uneven. It should be appreciated that the combination of the rotatable ring 164, with coupling member 174 and swivel member 176a allows the trailer 112 to be connected on uneven ground.

The length adjuster 118 includes a connecting member 240 extending axially and having a first end 242 and a second end 244, both of which have a reduced diameter. The first end 242 has an aperture 246 extending diametrically therethrough. The sleeve 236 is disposed over the first end 242 and attached thereto by another pin 224 extending through the apertures 237 and 246. The length adjuster 118 also has a stop collar 248 disposed over the first end 242 between the sleeve 236 and the connecting member 240. The length adjuster 118 includes a spring 250 disposed over the connecting member 240. The spring 250 is of a coil type. The length adjuster 118 includes an adjuster member 252 disposed over the connecting member 240. The adjuster member 252 is a tubular member and movable axially along the connecting member 240 for a function to be described. It should be appreciated that the spring 250 abuts one end of the adjuster member 252 and the stop collar 248.

The length adjuster 118 includes a receiver member 254, which extends axially outwardly therefrom. The receiver member 254 is generally cylindrical in shape and has a cavity 256 extending therein. The receiver member 254 also has an aperture 258 extending diametrically therethrough for a function to be described. The receiver member 254 has a stop collar 260 at one end thereof extending radially outwardly. The length adjuster 118 includes another or second swivel member 176b removably attachable by another pin 224 to the receiver member 254. The second swivel member 176b includes a spherically shaped swivel portion 226b and a connecting portion 228b extending from the swivel portion 226b. The connecting portion 228b has an aperture 230b extending diametrically therethrough. The connecting portion 228b is disposed in the cavity 256 and the pin 224 extends through the aperture 258 of the receiver member 254 and the aperture 230b of the connecting portion 228b of the second swivel member 176b. The length adjuster 118 may include another or second cup member 232b disposed between the second end 244 of the connecting member 240 and the second swivel member 176b. The second cup member 232b has a semi-spherical cavity 234b therein to receive the swivel portion 226b of the second swivel member 176b. The length adjuster 118 includes another or second sleeve 236b extending axially and disposed about the second swivel member 176b and second cup member 232b. The second sleeve 236b is generally tubular to receive the second swivel member 176 and second cup member 232b therein. The second sleeve 236b also has a reduced diameter portion 238b extending axially and radially inward to prevent the swivel portion 226b of the second connecting member from exiting the second sleeve 236b. It should be appreciated that the connecting portion 228 extends through the end of the reduced diameter portion 238b. It should also be appreciated that the second sleeve 236b is secured to the second end 244 of the connecting member 240 by suitable means such as welding. It should further be appreciated that the adjuster member 252 is disposed over the second sleeve 236 and urged against the stop collar 260 by the spring 250. It should still further be appreciated that the adjuster member 252 may be moved to compress the spring 250 and past the second sleeve 236 to allow the second swivel member 176 to rotate approximately ninety degrees (90°) relative to a longitudinal axis of the second sleeve 236 to provide a third degree of motion. Therefore, the second swivel member 176 allows separate side to side tipping movement and separate vertical movement of the motor vehicle 14 and trailer 112 and allows the trailer 112 to be connected to the motor vehicle 14 when the ground is uneven.

Figure 10:
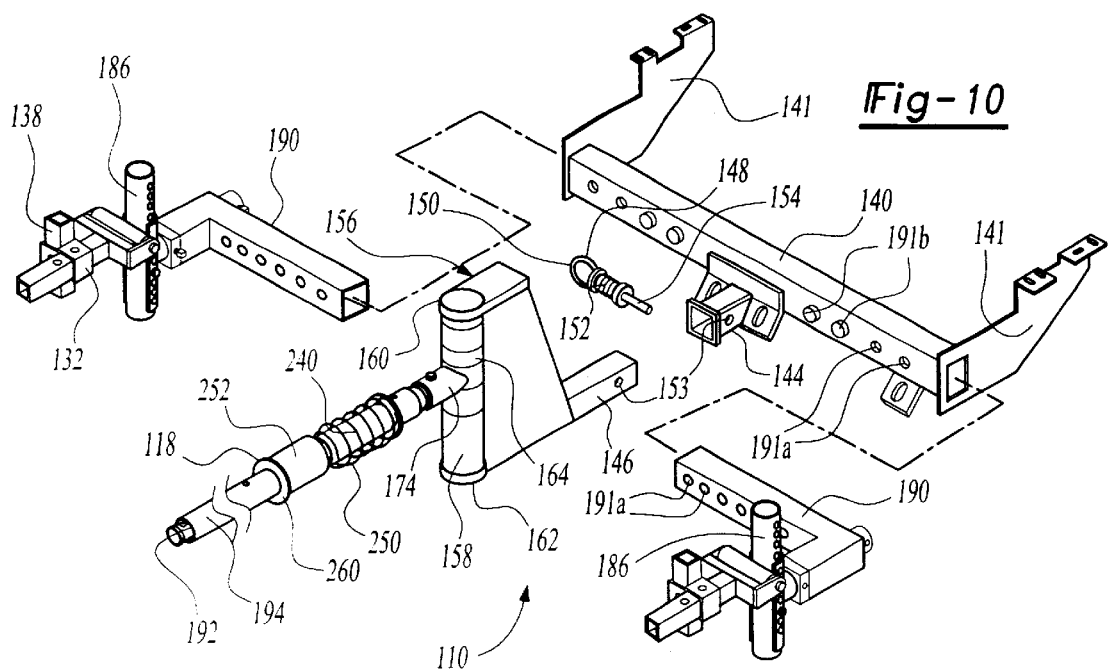
FIG. 10 is an exploded perspective view of another embodiment, according to the present invention, of the hitch assembly and trailer of FIG. 1.
Figure 11:
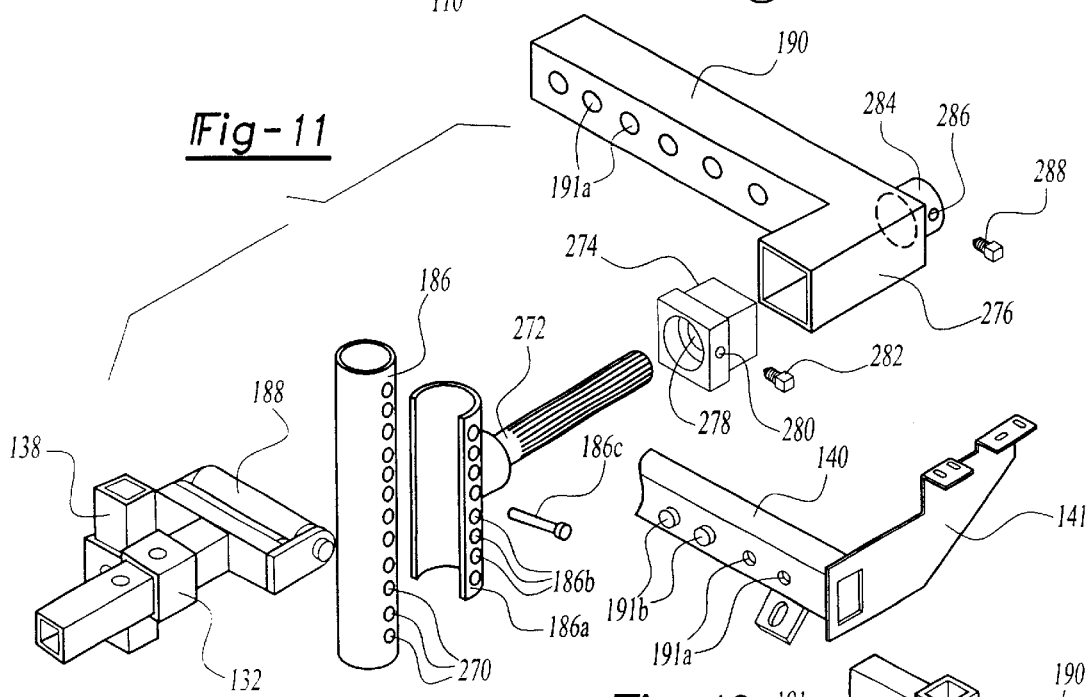
FIG. 11 is an enlarged exploded perspective view of a portion of the trailer of FIG. 10.
Figure 12:
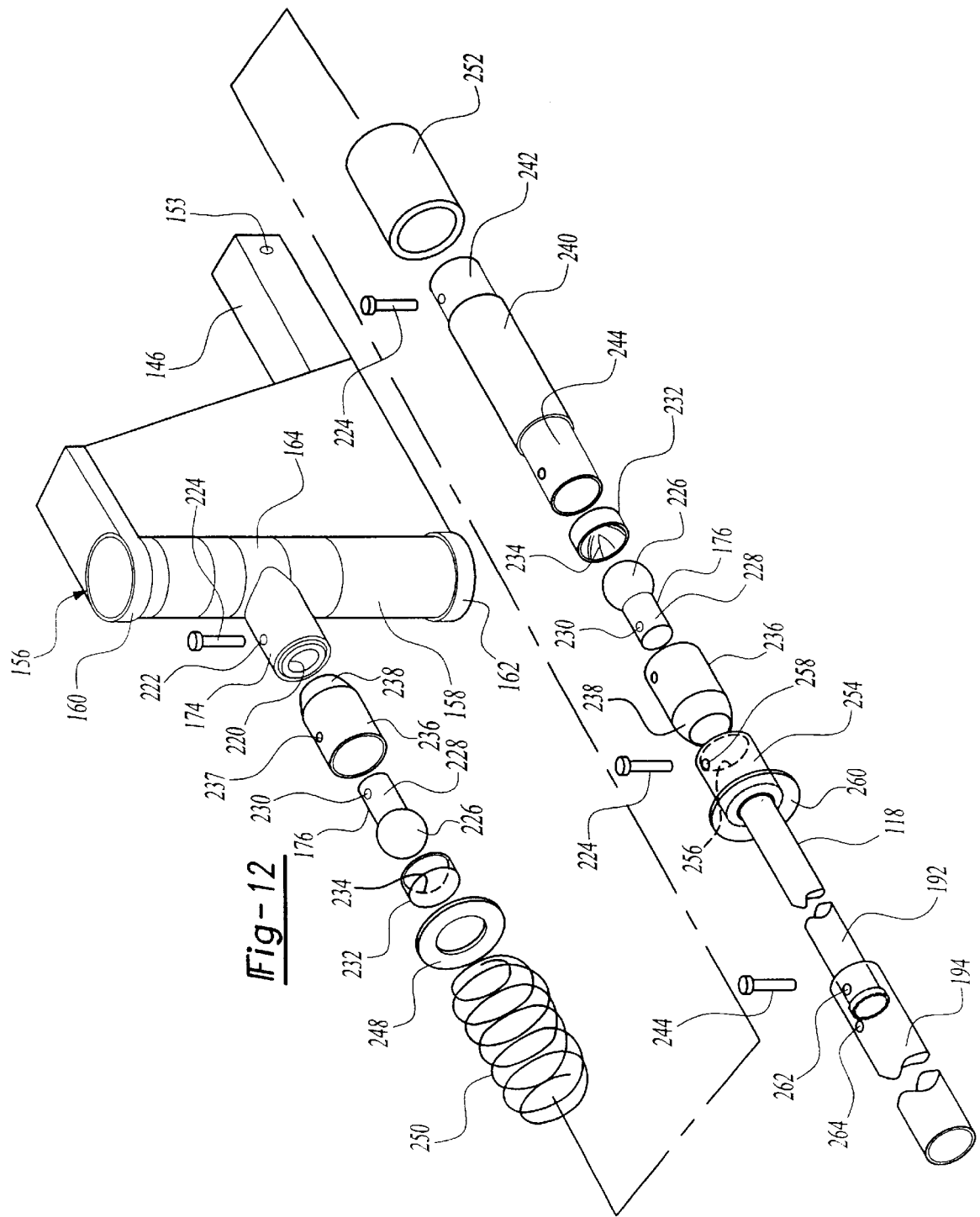
FIG. 12 is an exploded perspective view of the hitch assembly and trailer of FIG. 10.

Referring to FIGS. 10, 12 and 13, the length adjuster 118 includes a male tube 192 telescopingly disposed and slidably received within a female tube 194. The male tube 192 is attached to the receiver member 254 76 and the female tube 194 is attached to the frame 115 of the trailer 112. The male tube 192 has an aperture 262 extending diametrically therethrough near a rear end thereof and the female tube 194 has an aperture 264 extending diametrically therethrough near a forward end thereof. The length adjuster 118 includes another pin 244 extending through the aperture 262 when the female tube 194 is disposed over the male tube 192 to prevent the bed of the trailer 112 from being extended. The pin 244 can be removed and the female tube 192 slid rearward and the pin 244 extended through the apertures 264 and 262 to lock the tubes 192 and 194 together in the extended position. The tubes 192 and 194 are constructed of round stock to reduce cost and, in the extended position, allow the male tube 192 to rotate inside the female tube 194 and may eliminate the need for a rotating distal end of a ball socket. It should be appreciated that the trailer 112 is extended relative to the motor vehicle 14.

Referring to FIGS. 10, 11, 14 and 15, the hitch assembly 110 includes at least one bumper tube 186 extending out from the cross tube 140 on either side of the hitch receiver 144 such that they are disposed in space relation to the hitch tube 146. In one embodiment, there is at least one bumper tube 186 on either side of the hitch tube 146. The bumper tube 186 has a plurality of apertures 270 spaced axially and extending diametrically therethrough. The bumper tube 186 is adjustable vertically by a flange 186a having a plurality of apertures 186b and a fastener 186c extending through the apertures 186b in the flange 186a and the apertures 270 in the bumper tube 186. The bumper tubes 186 are operatively connected to the cross tube 140 with a horizontal adapter 190. The horizontal adapter 190 defines the spaced relation between the bumper tubes 186 and the hitch tube 146. In one embodiment, the horizontal adapter 190 is a tube insertable inside the cross tube 140. The horizontal adapter 190 is generally L shaped with a generally rectangular cross-section. The horizontal adapter 190 and cross tube 140 have a plurality of apertures 191a to allow lateral adjustment therebetween. The flange 186b has an arm member 272 extending axially. The arm member 272 is generally circular in cross-sectional shape. The horizontal adapter 190 has an insert 274 disposed in and secured to an end of a longitudinal portion 276 thereof by suitable means such as an interference fit. The insert 274 is generally rectangular in shape and has a generally circular aperture 278 extending longitudinally therethrough. The insert 274 includes an aperture 280 extending into the aperture 278 and a fastener 282 such as a screw extends through the aperture 280 to engage the arm member 272 when extended through the aperture 280. The horizontal adapter 190 may include a sleeve portion 284 extending forwardly opposite the longitudinal portion 276. The sleeve portion 284 has an aperture 286 extending diametrically therethrough and a fastener 288 extends through the aperture 286 and engages the arm member 272. As illustrated in FIG. 15, that the fasteners 282 and 288 may be loosened to allow the bumper tubes 186 to be rotated between a vertical position and a horizontal position as illustrated in FIG. 15 and tightened to secure the arm members 272 and horizontal adapters 190 together. When the bumper tubes 186 are moved from the vertical position to the horizontal position, rear doors on the motor vehicle 14 may be opened when the trailer 112 is hitched or connected to the motor vehicle 14. It should be appreciated that fasteners 191b such as bolts pass through a corresponding pair of apertures 191a to secure the horizontal adapter 190 and cross tube 140 together.

Extending out from the trailer 112 on either side of the hitch tube 146 is a roller or glide 188, which abuts the bumper tube 186. The roller 188 rolls up and down the bumper tube 186 depending on the relative position of the trailer 112 with respect to the motor vehicle 14. The relative position varies due to the suspension 124 and suspension (not shown) of the motor vehicle 14 having different responses to uneven ground as they move thereacross. The relative position may also be attributable to the uneven ground itself. The roller 188 and bumper tube 186 interface is required on either side of the hitch tube 146 if the wheels are to be steerable. The rollers 188 are connected to the frame 115 of the trailer 112 with the front legs 138. It should be appreciated that the point of contact between the bumper tube 186 and roller 188 must align both vertically and laterally with the center or axis line of the swivel portion 226a, as this would be the point of movement or flex between the trailer 112 and the motor vehicle 14.

Figure 18:
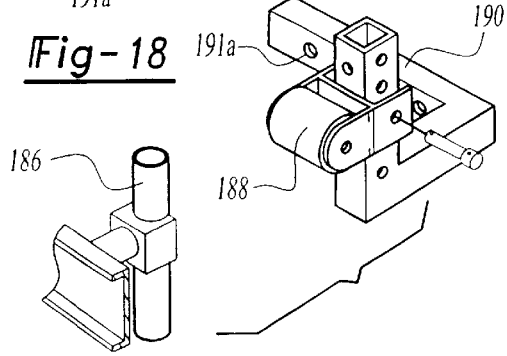
FIG. 18 is yet another embodiment, according to the present invention, of the hitch assembly and trailer of FIG. 1.

In another embodiment illustrated in FIG. 18, the roller 188 may be attached to the motor vehicle 14 and the bumper tube 186 attached to the trailer 112. In this embodiment, the bumper tube 186 is not adjustable and is secured to a connector 290 by suitable means such as welding, which, in turn, is secured to the trailer 112 by suitable means such as welding. The horizontal adapter 190 has an extension 292 extending vertically and having a plurality of apertures 294 extending diametrically therethrough and spaced axially therealong. The roller 188 has a pair of flanges 296 spaced laterally and extending longitudinally and disposed over the extension 292. The flanges 296 have an aperture 298 extending therethrough. The roller 188 is adjusted vertically to align itself with the axis of the swivel portion 226a by a pin 299 extending through the apertures 298 and one of the apertures 294 in the extension 292.

Referring to FIGS. 16 and 17, the trailer 112 also includes a suspension 124 in the form of a leaf spring, which is mounted by supports 125 to the frame 115. The suspension 124 has a forward eye 300 disposed in the forward support 125 and secured thereto by a fastener 302 such as a bolt extending through the forward eye 300 and threadably engaging the frame a side member 115a of the frame 115. It should be appreciated that the forward eye 300 is stationary or fixed relative to the frame 115.

The suspension 124 has a rearward eye 304 disposed in the rearward support 125. The suspension 124 has a sliding pocket member 306 disposed in the rearward support 125 and about the rearward eye 304. The rearward eye 304 is secured to the sliding pocket member 306 by a fastener 308 such as a bolt extending through the rearward eye 304 and threadably engaging the pocket member 306. The suspension 124 may include a coating such as graphite on either an interior surface of the rearward support 125 or exterior surface of the pocket member 306 to reduce friction therebetween. It should be appreciated that the rearward eye 304 is movable relative to the frame 115, allowing the leaf spring to flex with the load on the trailer 112 and allows the frame 115 to have a lower vertical height.

The present invention has been described in an illustrative manner. It is to be understood that the terminology, which has been used, is intended to be in the nature of words of description rather than of limitation.

Many modifications and variations of the present invention are possible in light of the above teachings. Therefore, within the scope of the appended claims, the present invention may be practiced other than as specifically described.

What is claimed is:

1. A hitch and trailer assembly comprising:
   a trailer having a mounting member;
   a cross member extending laterally and mountable to a motor vehicle;
   a hitch receiver connected to said cross member for receiving said mounting member therein; and
   a plurality of rollers for connection to one of said trailer and said cross member on either side of said hitch receiver to be disposed in spaced relation to said mounting member and a plurality of bumpers for connection to the other one of said trailer and said cross member on either side of said hitch receiver to be disposed in spaced relation to said mounting member to allow said rollers and said bumpers to abut each other when said mounting member is disposed within said hitch receiver.

2. A hitch and trailer assembly as set forth in claim 1 including means for adjusting said bumpers vertically relative to said rollers.

3. A hitch and trailer assembly as set forth in claim 2 including means for rotating said bumpers between a generally vertical position and a generally horizontal position.

4. A hitch and trailer assembly as set forth in claim 1 wherein said trailer includes a frame, a plurality of wheels and a suspension operatively connecting said wheels to said frame.

5. A hitch and trailer assembly as set forth in claim 4 wherein said suspension comprises a leaf spring having a forward spring eye and a rear spring eye.

6. A hitch and trailer assembly as set forth in claim 5 wherein said suspension further comprises a forward spring support connected to said frame and a rear spring support connected to said frame, said forward spring eye being disposed in said forward spring support and said rear spring eye being disposed in said rear spring support.

7. A hitch and trailer assembly as set forth in claim 6 including means for fixing said forward spring eye to said forward spring support.

8. A hitch and trailer assembly as set forth in claim 6 including means for allowing said rear spring eye to slide relative to said rear spring support.

9. A hitch and trailer assembly comprising:
   a trailer having a mounting member;
   a hitch receiver mountable to a motor vehicle for receiving said mounting member;
   a plurality of rollers for connection to one of said trailer and the motor vehicle and a plurality of bumpers for connection to the other one of said trailer and the motor vehicle to allow said rollers and said bumpers abut each other when said mounting member is disposed in said hitch receiver; and
   a horizontal adapter for adjusting either one of said rollers and said bumpers laterally relative to said hitch receiver.

10. A hitch and trailer assembly comprising:
    a trailer having a mounting member;
    a hitch receiver mountable to a motor vehicle for receiving said mounting member;
    a plurality of rollers for connection to one of said trailer and the motor vehicle and a plurality of bumpers for connection to the other one of said trailer and the motor vehicle to allow said rollers and said bumpers abut each other when said mounting member is disposed in said hitch receiver; and
    an adapter structure connected to said mounting member having a receiving tube extending generally perpendicular to said mounting member.

11. A hitch and trailer assembly as set forth in claim 10 wherein said adapter structure includes a rotatable ring disposed about said receiving tube for allowing a first degree of motion to said trailer when secured by said mounting member to said hitch receiver.

12. A hitch and trailer assembly as set forth in claim 11 including a length adjuster connected to said trailer and said rotatable ring.

13. A hitch and trailer assembly as set forth in claim 12 wherein said length adjuster has a first spherical connection to allow a second degree of motion to said trailer when secured by said mounting member to said hitch receiver.

14. A hitch and trailer assembly as set forth in claim 13 wherein said length adjuster has a second spherical connection to allow a third degree of motion to said trailer when secured by said mounting member to said hitch receiver.

15. A hitch and trailer assembly as set forth in claim 11 wherein said length adjuster includes a male member operatively connected to said rotatable ring and a female member telescopingly disposed about said male member and operatively connected to said trailer.

16. A hitch and trailer assembly comprising:
    a trailer having a mounting member;
    a hitch receiver mountable to a motor vehicle for receiving said mounting member;
    an adapter structure connected to said mounting member having a receiving tube extending generally perpendicular to said mounting member and a rotatable ring disposed about said receiving tube for allowing a first degree of motion to said trailer when secured by said mounting member to said hitch receiver; and
    a plurality of rollers for connection to one of said trailer and the motor vehicle and a plurality of bumpers for connection to the other one of said trailer and the motor vehicle to allow said rollers and said bumpers abut each other when said mounting member is disposed in said hitch receiver.

17. A hitch and trailer assembly as set forth in claim 16 including means for adjusting said bumpers vertically relative to said rollers.

18. A hitch and trailer assembly as set forth in claim 16 including means for rotating said bumpers between a generally vertical position and a generally horizontal position.

19. A hitch and trailer assembly as set forth in claim 16 including a horizontal adapter for adjusting either one of said rollers and said bumpers laterally relative to said hitch receiver.

20. A hitch and trailer assembly comprising:

a trailer having a frame, a mounting member operatively connected to said frame, a plurality of wheels and a suspension operatively connecting said wheels to said frame;

said suspension comprising a leaf spring having a forward spring eye and a rear spring eye, a forward spring support connected to said frame and a rear spring support connected to said frame, said forward spring eye being disposed in said forward spring support and said rear spring eye being disposed in said rear spring support, means for fixing said forward spring eye to said forward spring support, and means for allowing said rear spring eye to slide relative to said rear spring support;

a hitch receiver mountable to a motor vehicle for receiving said mounting member; and a plurality of rollers for connection to one of said trailer and the motor vehicle and a plurality of bumpers for connection to the other one of said trailer and the motor vehicle to allow said rollers and said bumpers abut each other when said mounting member is disposed in said hitch receiver.

21. A hitch and trailer assembly comprising:

a trailer having a frame, a mounting member operatively connected to said frame, a plurality of steerable wheels and a suspension operatively connecting said steerable wheels to said frame;

a hitch receiver mountable to a motor vehicle for receiving said mounting member; and a plurality of rollers for connection to one of said trailer and the motor vehicle and a plurality of bumpers for connection to the other one of said trailer and the motor vehicle to allow said rollers and said bumpers abut each other when said mounting member is disposed in said hitch receiver.

22. A hitch and trailer assembly as set forth in claim 21 including means for locking said steerable wheel from pivotal movement when said trailer is in an extended position such that said rollers and said bumpers are not abutting each other.

* * * * *